US007052085B2

(12) United States Patent
Hoey-Slocombe et al.

(10) Patent No.: US 7,052,085 B2
(45) Date of Patent: May 30, 2006

(54) ACCESSORIES FOR PERMABULATORS OR STROLLERS

(76) Inventors: Eileen Marie Hoey-Slocombe, 39 Balmain Road, Birkenhead, Auckland (NZ); Louise Anne Dawson, 1/84 Nebron Road, Torbay, Auckland (NZ)

( * ) Notice: Subject to any disclaimer, the term of this patent is extended or adjusted under 35 U.S.C. 154(b) by 307 days.

(21) Appl. No.: 10/122,323

(22) Filed: Apr. 16, 2002

(65) Prior Publication Data
US 2003/0193221 A1  Oct. 16, 2003

(51) Int. Cl.
*A47D 15/00* (2006.01)

(52) U.S. Cl. .................................. 297/219.12
(58) Field of Classification Search ............ 297/184.1, 297/184.11, 184.13, 184.14, DIG. 6, 219.12, 297/224, 228.11, 228.12, 228.13, 256.17, 297/256.16, 130; 280/650, 47.38, 647; 296/136.11, 296/77.1; 150/166, 167, 158; 135/88.02, 135/88.01, 90
See application file for complete search history.

(56) References Cited

U.S. PATENT DOCUMENTS

| | | | | |
|---|---|---|---|---|
| 1,289,965 | A | * | 12/1918 | Tichenor ............... 296/107.02 |
| 1,770,841 | A | * | 7/1930 | Clyman ..................... 296/81 |
| 2,129,080 | A | * | 9/1938 | Braminick ................. 135/115 |
| 2,648,565 | A | * | 8/1953 | Kennedy et al. .......... 296/77.1 |
| 2,707,988 | A | * | 5/1955 | Shaub et al. |
| 3,227,484 | A | * | 1/1966 | Merclean ................... 296/77.1 |
| 4,750,783 | A | * | 6/1988 | Irby et al. |
| 4,945,584 | A | * | 8/1990 | LaMantia ..................... 5/97 |
| 5,150,945 | A | * | 9/1992 | Aupperlee et al. |
| 5,243,724 | A | * | 9/1993 | Barnes |
| 5,441,789 | A | * | 8/1995 | Walker |
| 5,527,096 | A | * | 6/1996 | Shimer |
| 5,542,732 | A | * | 8/1996 | Pollman |
| 5,547,250 | A | * | 8/1996 | Childers |
| 5,678,888 | A | * | 10/1997 | Sowell et al. |
| 5,730,490 | A | * | 3/1998 | Mortenson |
| 5,785,333 | A | * | 7/1998 | Hinkston et al. |
| 5,897,165 | A | * | 4/1999 | Kucharczyk et al. |
| 5,915,399 | A | * | 6/1999 | Yang ........................ 135/88.01 |
| 5,950,261 | A | * | 9/1999 | Hay et al. |
| 5,975,558 | A | * | 11/1999 | Sittu |
| 5,975,613 | A | * | 11/1999 | Sippel |
| 6,012,756 | A | * | 1/2000 | Clark-Dickson ........... 296/77.1 |
| 6,039,393 | A | * | 3/2000 | Roh |
| 6,056,355 | A | * | 5/2000 | Klassen |
| 6,145,932 | A | * | 11/2000 | Hamel-Nyhus et al. |

(Continued)

*Primary Examiner*—Milton Nelson, Jr.
(74) *Attorney, Agent, or Firm*—O. M. (Sam) Zaghmout; Bio Intellectual Property Services (Bio IPS) LLC

(57) ABSTRACT

A stroller 2 is fitted with a sun shade 1. The shade 1 has a flexible sheet 3 of mesh fabric extending around the front of the stroller 2 to shade an infant therein. The shade 1 has an elasticised pocket 5 and fastenings 4 to attach it to the stroller 2. The front of the shade 1 has a cover portion or "drop down" 6 in the form of a flap which can be lowered to increase the sun protection to the infant. The shade 1 is length adjustable so that it can be used with strollers of various sizes. A sleeping sack 12 may be used with the stroller. The sack 12 has a base part 14 and two flaps 15 and 16 which can be joined by way of a zipper arrangement 17. The sack 12 has a series of slits 20 for receiving restraining straps of the stroller 2. The sack includes a padded inner 21 which can releasably attach to the base part 14. The sack 12 is length adjustable.

5 Claims, 3 Drawing Sheets

U.S. PATENT DOCUMENTS

| | | |
|---|---|---|
| 6,209,953 B1 * | 4/2001 | Mackay et al. |
| 6,224,073 B1 * | 5/2001 | Au |
| 6,224,152 B1 * | 5/2001 | Hughes et al. |
| 6,237,998 B1 * | 5/2001 | Aprile |
| 6,296,307 B1 * | 10/2001 | Holtke |
| 6,497,444 B1 * | 12/2002 | Simon ........................ 296/83 |
| 6,517,153 B1 * | 2/2003 | Brewer .................. 297/184.13 |
| 6,626,452 B1 * | 9/2003 | Yang et al. ................. 280/643 |

* cited by examiner

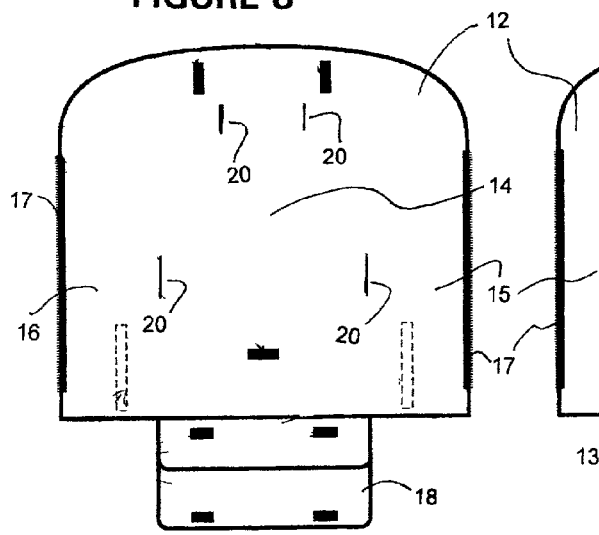
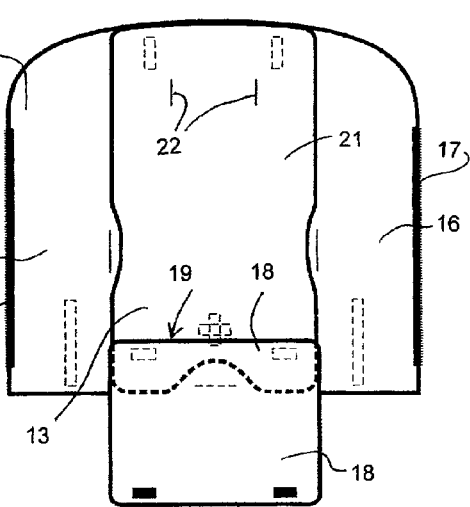
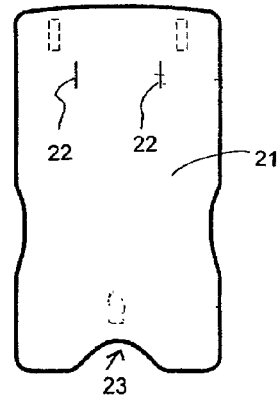

ACCESSORIES FOR PERMABULATORS OR STROLLERS

FIELD OF INVENTION

This invention relates to accessories for infant perambulators or strollers. In particular, one preferred form of the invention relates to a sun shade, and another preferred form of the invention relates to a sleeping sack.

It is known to use perambulators or strollers to transport infants from one place to another. A problem with this form of transportation is that while outdoors in a stroller or perambulator, an infant can be undesirably exposed to excessive sunlight or to cold outdoor temperatures. Excessive sunlight can lead to an infant receiving sun stroke or sun burn, and cold conditions can lead to an infant becoming chilled. It is accordingly an object of at least some forms of the present invention to go at least some way towards addressing the above problem.

The term "comprise", "comprises", "comprised", or "comprising", if and when used herein, should be interpreted non-exclusively—ie to convey "consisting of or including".

SUMMARY OF THE INVENTION

According to one aspect of the invention there is provided a shade for a stroller or perambulator, comprising a flexible sheet, attachment means, and a cover portion;

the shade being formed such that when it is in use it can be attached to a stroller or perambulator by way of the attachment means such that a front portion of the flexible sheet provides protection from sunlight to an occupant seated or laying in the stroller or perambulator, and the cover portion can be moved to cover at least some of the front portion of the flexible sheet to increase shade protection to the occupant, and wherein the cover can subsequently be moved away from the front portion of the flexible sheet. Preferably the cover portion is in the form of a flap attached to the flexible sheet. Preferably the shade includes a hood engaging pocket to facilitate engagement of the shade with a hood of the stroller or perambulator when the shade is in use, the hood engaging portion being in the form of an elasticised pocket adjacent the cover portion.

In a further aspect of the invention there is provided a shade for a stroller or perambulator, comprising a flexible sheet, attachment means, and an elasticised pocket;

the shade being formed such that when it is in use it can be attached to a stroller or perambulator by way of the attachment means and the pocket, wherein the attachment means binds the shade to lower or medial parts of the stroller or perambulator, and wherein the pocket receives part of a hood of the stroller or perambulator such that elastic tension in the pocket resists inadvertent removal of the hood from the pocket, and wherein when the shade is attached to the stroller or perambulator the flexible sheet provides protection from sunlight to an occupant seated or laying in the stroller or perambulator.

Preferably the attachment means comprises strips of binding material which can be releasably secured to the stroller or perambulator.

In a further aspect of the invention there is provided a shade for a stroller or perambulator, comprising a flexible sheet, attachment means, and length adjustment means;

the shade being formed such that when it is in use it can be attached to a stroller or perambulator by way of the attachment means such that a front portion of the flexible sheet provides protection from sunlight to an occupant seated or laying in the stroller or perambulator, and wherein when the shade is in such use the length adjustment means enables a lower portion of the flexible sheet to be folded back on another part of the flexible sheet and held there to provide length adjustability to the shade. Preferably the length adjustment means comprises fastenings (eg hook and loop fastenings) on the flexible sheet. Preferably the length adjustment means comprises a first fastening extending longitudinally with respect to the shade, and a second fastening which can engage the first fastening at selected positions along the first fastening.

According to a further aspect of the invention there is provided a body sack for use with a stroller or perambulator, comprising a body portion, attachment means, and length adjustment means;

the sack being formed such that when it is in use the attachment means enables the sack to be secured to a stroller or perambulator and wherein the length adjustment means enables the body portion to be folded back on itself and held there to reduce or increase space within the sack for receiving an infant. Preferably the attachment means comprises a series of slits in the body portion for receiving infant restraining straps of the stroller or perambulator.

In a further aspect of the invention there is provided body sack for use with a stroller or perambulator, comprising a body portion and a padded inner;

the body portion and the inner each having apertures for receiving restraining straps of the stroller or perambulator when the sack is in use such that the restraining straps can proceed through the apertures and restrain an infant within the sack. Preferably the apertures comprise slits in the body portion and the inner.

DESCRIPTION OF DRAWINGS

Some preferred forms of the invention will know be described by way of example, and with reference to the accompanying drawings, of which:

FIG. 7 is a front view of an infant sleeping sack for use with a stroller when laid out, FIG. 8 is a front view of the sack when laid out (without the "inner" referred to hereinafter), FIG. 9 shows a front view of an "inner" forming part of the sack, and FIGS. 10 and 11 show the sack in various dispositions.

DETAILED DESCRIPTION

Figure 1:
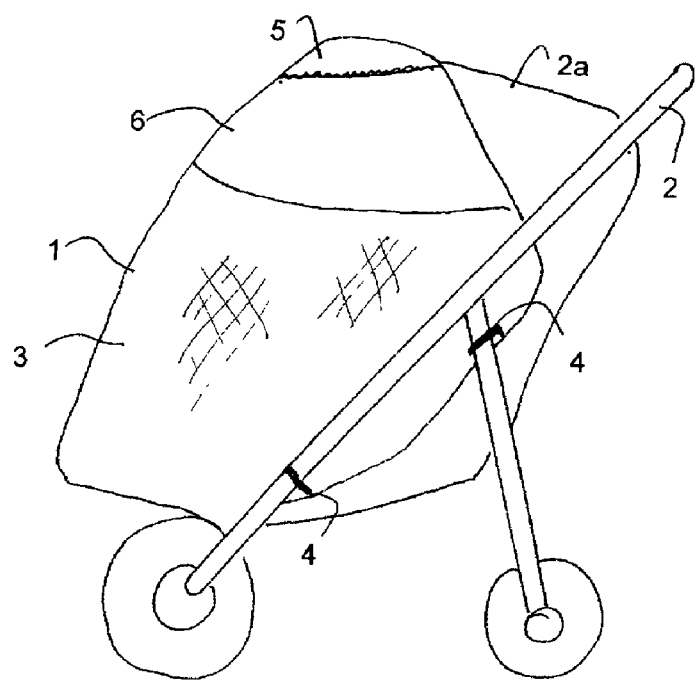
FIG. 1 shows a sun shade fitted to a stroller.

Referring to FIGS. 1, 2, 3, 4, 5 and 6, a sun shade 1 in accordance with the invention is shown fitted to a stroller 2. The shade 1 comprises a flexible sheet 3 of mesh fabric which extends around the front of the stroller to provide shade to an infant seated or laying within the stroller. The sides of the shade 1 attach to the sides of the stroller 2 by way of hook and loop (eg Velcro™) fastenings 4. The upper part of the shade attaches to the hood 2a of the stroller by way of an elasticised pocket 5 as will be described in more detail hereinafter.

Figure 2:
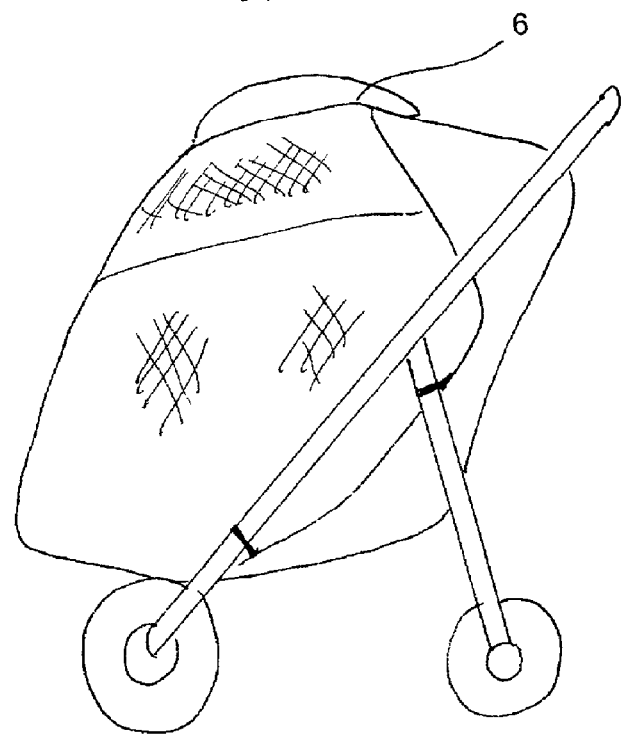
FIG. 2 shows the sun shade in one possible disposition on the stroller.
Figure 3:
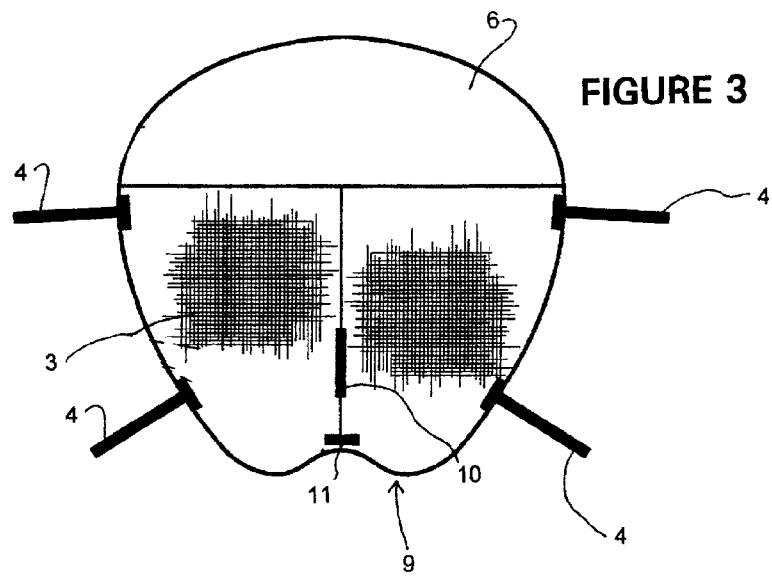
FIG. 3 is a front view of the shade when laid out apart from the stroller.

Referring to FIG. 3, the front of the shade has a cover portion—ie a "drop down" 6, preferably formed from a flexible non-mesh fabric. The drop down 6 extends from the rest of the shade as a flap which can be lowered to cover an upper front part of the shade to increase the amount of shade protection to an infant within the stroller. The drop down 6 may have all of its edges, except its front lower edge, stitched to the rest of the shade. FIG. 1 shows the drop down 6 in a lowered position, and FIG. 2 shows the drop down when pulled back over the elasticised pocket 5.

Figure 6:
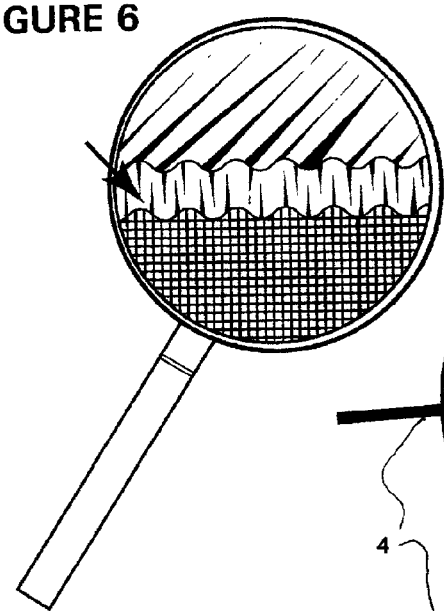
FIGS. 5 and 6 show detail of upper parts of the shade.
Figure 4:
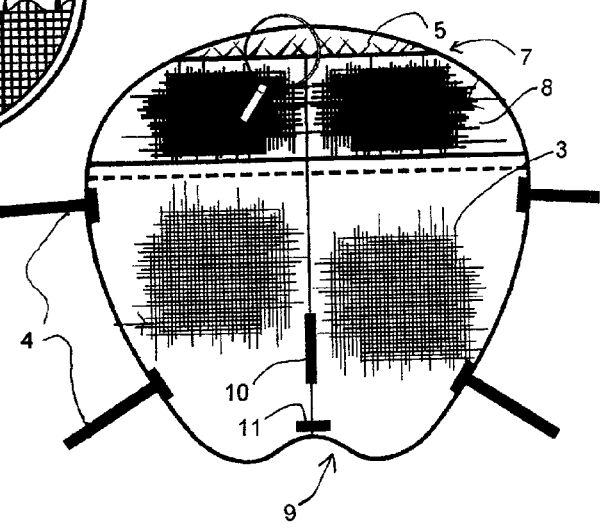
FIG. 4 is a rear view of the shade when laid out apart from the stroller.
Figure 5:
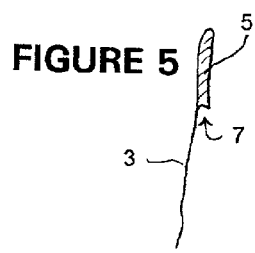

Referring to FIGS. 4, 5 and 6, the elasticised pocket 5 is stitched to the rest of the shade 1 such that it has one open edge 7 for receiving the hood of the stroller as discussed above. The elastic tension provided by the pocket 5 ensures that it is not readily able to come free from the hood.

With further reference to FIG. 4, an upper section 8 of the sheet 3 is a double layer of the mesh fabric to increase the protection provided to an infant within the stroller.

Referring to FIGS. 3 and 4, the shade 1 is length adjustable so that it can be used with strollers of varying sizes. This is desirable as if the shade is not long enough it may not adequately protect the legs of an infant, and if it is too long it may undesirably drag on the ground or interfere with the front wheel or wheels of the stroller. To achieve length adjustability the lower front part 9 of the shade may be folded back onto the rest of the shade and held in place by way of hook and loop fastenings 10 and 11. As shown, the fastening 10 is elongate, extending vertically, and is above the fastening 11. The elongate nature of the vertically extending fastening 10 means that it provides various points of attachment for the other fastening 11.

Referring to FIGS. 7 and 8, a sleeping bag-like sack 12 has a body portion 13, the body portion having a base part 14 and a front part. The front part is formed from two flaps 15 and 16 which can be releasably joined to one another by way of a zipper arrangement 17. Referring to FIG. 7, a lower part of the sack/body portion is in the form of a pouch 18, the open upper edge 19 of which lays against the flaps 15 and 16 when they are joined to one another. The pouch 18 is intended for receiving at least the feet of an infant.

Referring to FIG. 8, the sack has attachment means in the form of a series of slits 20 in the base part 14 through which can pass the restraining straps of a stroller. The arrangement is such that an infant can be simultaneously buckled into the stroller and the sack by way of the stroller's restraining straps. When buckled into the stroller in this way the restraining straps are joined to one another within the sack beneath the closed flaps 15 and 16.

Referring to FIGS. 7 and 9, the sack 12 includes a padded inner 21 (eg an artificial or natural sheepskin), which can releasably attach to the base part 14 by way of hook and loop fastenings or some other suitable means. The inner 21 has slits 22 complimentary to some of the slits 20 of the base part 14. The arrangement is such that the restraining straps can simultaneously pass through the base 14 and the inner 21. The inner is designed for use within the rest of the sack to provide a soft and comfortable area for an infant to rest his or her torso on. If desired, the inner and the rest of the sack can be used independently. As shown in FIG. 9, the inner has a recessed portion 23 to accommodate the forward restraining strap of a stroller, although in some alternative embodiments the recessed portion may be substituted by a further slit.

Because infants grow rapidly it is desirable that the sleeping sack be length adjustable. Referring to FIGS. 10 and 11, to achieve this length adjustability the pouch 18 can be folded back onto the rest of the sack in varying degrees, and can then be secured in place by way of hook and loop fastenings 24 and 25. A shown, the fastenings 24 are on the flaps 15 and 16 and extend longitudinally with respect to the rest of the sack to provide multiple points of attachment for the lower fastenings 25.

Referring to FIGS. 10 and 11, an upper region 26 of the pouch 18 can attach to the fastenings 24 (see FIG. 10), and can then be detached from the fastenings 24 to fold back against the rest of the pouch (see FIG. 11). This is possible as the sides of the pouch immediately adjacent the open upper edge 19 of the pouch are not stitched against the rest of the sack. The arrangement is such that an infant can be more easily placed in, and latter removed from, the sack.

It should of-course be appreciated that while various references have been made herein to hook and loop fastenings, other types of fastenings, for example button arrangements, etc, could be used as an alternative.

While some preferred aspects of the invention have been described by way of example, it should be appreciated that improvements and modifications can occur without departing from the scope of the appended claims.

The invention claimed is:

1. A stroller or perambulator body sack, comprising a body portion, attachment means, and length adjustment means;
    the sack being formed such that when it is in use the attachment means enables the sack to be secured to a stroller or perambulator and wherein the length adjustment means enables the body portion to be folded back on itself and held there to reduce or increase lengthways space within the sack for receiving an infant; wherein the body portion comprises a base, two flaps extending from the base, and a pouch;
    the flaps having securement means to enable them to be releasably secured to one another, and the pouch being adjacent the base and adjacent the flaps;
    the sack being formed such that when it is in use the feet of an infant can extend into the pouch and the torso of the infant can be between the base and the flaps; and wherein restraining straps of the stroller or perambulator can be received by the attachment means.

2. A stroller or perambulator body sack, comprising a body portion, attachment means, and length adjustment means;
    the sack being formed such that when it is in use the attachment means enables the sack to be secured to a stroller or perambulator and wherein the length adjustment means enables the body portion to be folded back on itself and held there to reduce or increase lengthways space within the sack for receiving an infant; wherein the body portion comprises a base, two flaps extending from the base, a pouch, and a padded inner;
    the flaps having securement means to enable them to be releasably secured to one another, and the pouch being adjacent the base and adjacent the flaps;
    the sack being formed such that when it is in use the feet of an infant can extend into the pouch and the torso of the infant can rest on the inner between the base and the flaps; and wherein restraining straps of the stroller or perambulator can be received by the attachment means and pass through the inner to restrain the infant within the sack.

3. A stroller or perambulator shade, the shade being of a shape and size to compliment a stroller or perambulator, the shade comprising a mesh flexible sheet, attachment means, and a cover portion;

the shade being formed such that when it is in use it can be attached to a stroller or perambulator by way of the attachment means such that a front portion of the mesh flexible sheet provides protection from sunlight to an occupant, specifically to a torso and legs of the occupant, seated or laying in the stroller or perambulator, and the cover portion can be moved to cover at least some of the front portion of the mesh flexible sheet to increase shade protection to the occupant, and wherein the cover portion can subsequently be moved away from the front portion of the flexible sheet, and wherein the stroller or the perambulator shade further comprises length adjustment means, and wherein the length adjustment means enables a lower portion of the flexible sheet to be folded back on another part of the flexible sheet and held there to provide length adjustability to the shade, and wherein the length adjustment means comprises a first fastening extending longitudinally with respect to the rest of the shade, and a second fastening which can attach to the first fastening at selected positions along the first fastening.

4. A shade for a stroller or perambulator according to claim 3, wherein the cover portion is in the form of a flap.

5. A shade for a stroller or perambulator according to claim 3, wherein the cover portion is in the form of a flap attached to the flexible sheet.

* * * * *